(12) United States Patent
Ketkale et al.

(10) Patent No.: US 12,440,094 B2
(45) Date of Patent: Oct. 14, 2025

(54) ILLUMINATION APPARATUS

(71) Applicant: Maxer Endoscopy GmbH, Wurmlingen (DE)

(72) Inventors: Sourabh Ketkale, Tuttlingen (DE); Shirish Joshi, Wurmlingen (DE)

(73) Assignee: Erbe Vision GmbH, Wurmlingen (DE)

( * ) Notice: Subject to any disclaimer, the term of this patent is extended or adjusted under 35 U.S.C. 154(b) by 0 days.

(21) Appl. No.: 17/392,318

(22) Filed: Aug. 3, 2021

(65) Prior Publication Data
US 2022/0039642 A1   Feb. 10, 2022

(30) Foreign Application Priority Data

Aug. 3, 2020   (EP) ..................................... 20189106

(51) Int. Cl.
*A61B 1/00*   (2006.01)
*A61B 1/04*   (2006.01)
*A61B 1/06*   (2006.01)

(52) U.S. Cl.
CPC ............ *A61B 1/0646* (2013.01); *A61B 1/043* (2013.01)

(58) Field of Classification Search
CPC ... A61B 1/0646; A61B 1/043; A61B 1/00149; A61B 1/00128; A61B 1/00142; A61B 1/00126; A61B 1/0669; A61B 1/06; A61B 1/01; A61B 6/00; A61B 90/30; A61B 90/39; A61B 2090/309; A61B 2090/3941; A61B 1/00186; A61B 90/35; A61B 90/37; A61B 2017/00438; A61B 2090/373; G02B 23/2461; G02B 23/2476; F21V 33/0068; F21W 2131/205
See application file for complete search history.

(56) References Cited

U.S. PATENT DOCUMENTS

| | | | | |
|---|---|---|---|---|
| 4,915,626 A | * | 4/1990 | Lemmey .................. | G09B 5/02 348/66 |
| 5,498,230 A | * | 3/1996 | Adair .................. | A61B 1/00126 600/122 |
| 5,682,199 A | * | 10/1997 | Lankford .................. | A61B 1/05 600/200 |
| 5,702,349 A | * | 12/1997 | Morizumi .......... | A61B 1/00188 600/131 |

(Continued)

FOREIGN PATENT DOCUMENTS

| | | |
|---|---|---|
| AU | 2013101537 B4 | 9/2014 |
| WO | 2020/148725 A1 | 7/2020 |

OTHER PUBLICATIONS

Sylvain Gioux et al: "High-Power, Computer-Controlled, Light-Emitting Diode-Based Light Sources for Fluorescence Imaging and Image-Guided Surgery", Molecular Imaging, vol. 8, No. 3, May 1, 2009, XP055764170, ISSN: 1536-0121, DOI: 10.2310/7290.2009.00009.

(Continued)

*Primary Examiner* — Timothy J Neal
(74) *Attorney, Agent, or Firm* — Bachman & LaPointe, P.C.

(57) ABSTRACT

An illumination apparatus (1) for illuminating the operating field during open surgery with radiation to cause fluorescence, the apparatus including a main body (2) including an opening (3) configured to release the radiation (18), is (Continued)

characterized by an attachment unit or assembly (4) for removably attaching the main body (2) sideways to an endoscope (5).

11 Claims, 5 Drawing Sheets

(56) References Cited

U.S. PATENT DOCUMENTS

| | | | | |
|---|---|---|---|---|
| 6,605,036 | B1* | 8/2003 | Wild | A61B 17/2909 600/114 |
| 2003/0045780 | A1* | 3/2003 | Utsui | A61B 1/0638 600/104 |
| 2004/0215057 | A1* | 10/2004 | Wellman | A61B 1/00048 600/114 |
| 2005/0234297 | A1* | 10/2005 | Devierre | A61B 1/00087 600/129 |
| 2007/0213586 | A1* | 9/2007 | Hirose | A61B 1/00149 600/109 |
| 2007/0282305 | A1* | 12/2007 | Goldfarb | A61B 1/01 604/528 |
| 2013/0071077 | A1* | 3/2013 | Demers | A61B 1/00103 385/116 |
| 2013/0303845 | A1* | 11/2013 | Skula | A61B 17/0682 606/139 |
| 2014/0343358 | A1* | 11/2014 | Hameed | G02B 23/2423 600/109 |
| 2015/0157209 | A1* | 6/2015 | Dantus | A61B 5/0036 600/317 |
| 2016/0058494 | A1* | 3/2016 | Vayser | A61B 18/14 606/41 |
| 2017/0143188 | A1* | 5/2017 | Oskin | A61B 1/018 |
| 2017/0209033 | A1* | 7/2017 | Yu | A61B 1/00105 |
| 2019/0217080 | A1* | 7/2019 | Moss | A61B 18/1402 |
| 2020/0221932 | A1* | 7/2020 | Ouyang | A61B 1/00103 |
| 2021/0022720 | A1* | 1/2021 | Smith | A61B 17/00234 |
| 2021/0186304 | A1* | 6/2021 | Joshi | A61B 1/0016 |
| 2022/0061671 | A1* | 3/2022 | Dacosta | A61B 5/1495 |
| 2022/0248944 | A1* | 8/2022 | Dacosta | A61B 1/00128 |

OTHER PUBLICATIONS

Office Action dated Jan. 31, 2023 for corresponding application EP20189106.6.

* cited by examiner

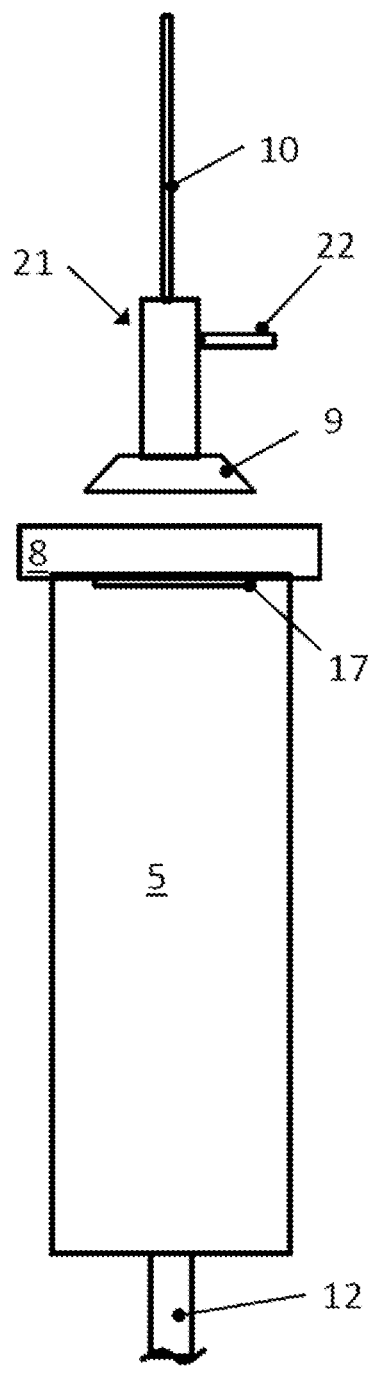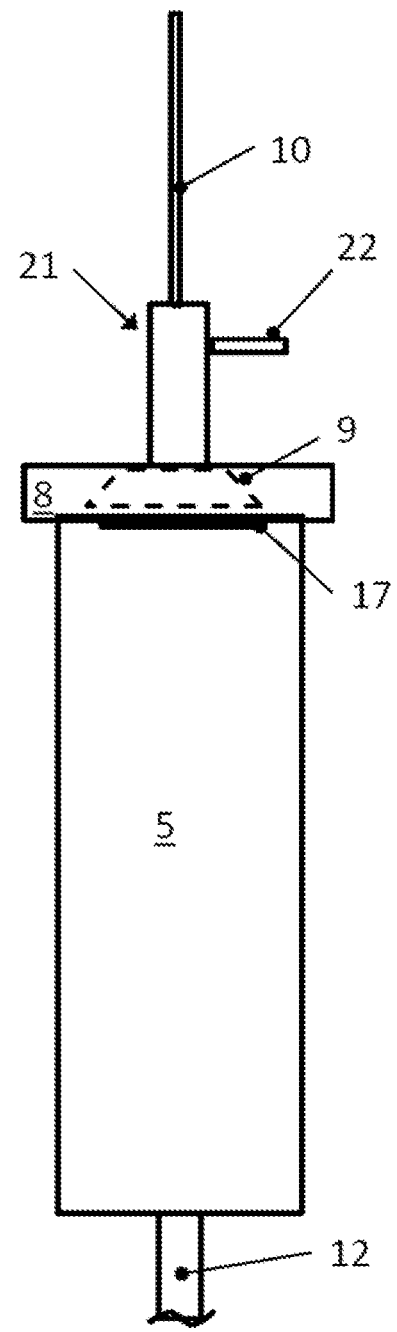
Prior Art
Figure 1A
Prior Art
Figure 1B

ILLUMINATION APPARATUS

TECHNICAL FIELD

The present invention relates to an improved apparatus to be used during fluorescence-guided open surgery.

STATE OF THE ART

Conducting fluorescence-guided open surgery is commonly used for tumour resection. The fluorescence radiation deployed is usually detected by a camera, i.e. by a chip/photo sensor, or through an eyepiece with the help of respective filters which sort out radiation of any wavelength but the fluorescent radiation.

Currently, fluorescence-guided/supported open surgery is conducted in two ways.

First a special camera designed, constructed and bought only or at least mainly for the purpose of fluorescence-guided/supported open surgery is used. This special camera comprises a radiation source emitting the desired excitation radiation which causes fluorescence. The disadvantage of such a system is that separate equipment is needed which has to be bought to conduct fluorescence-guided open surgery.

Second a commonly used endoscope imager is used. An endoscope imager may be the camera to which the endoscope, e.g. via its eyepiece, is coupled during endoscopic surgery. This endoscope imager is used for acquiring the fluorescence image. The fluorescence is caused by an illumination apparatus which may be connected to the endoscope imager, e.g. via a coupler. Usually, an endoscope imager comprises exactly one such coupler accommodating the endoscope during endoscopic surgery. This is usually done by accommodating the eyepiece of the endoscope in the coupler. When the eyepiece of the endoscope is removed from the endoscope imager, the illumination apparatus described above may be connected thereto. Using an endoscope imager, the hospital does not need to buy an extra apparatus such as the first one described above to conduct fluorescence-guided/supported open surgery. However, the disadvantage with the second system is that a specially designed sterile cover is needed for the reasons explained hereinafter.

During endoscopic surgery, a standard sterile cover covering the endoscope imager is connected to the coupler together with the endoscope. Since the endoscope is usually sterilized before surgery, only the endoscope imager, which is not sterilisable due to the electric parts included, has to be shielded with a sterile cover.

However, when the endoscope imager is used without the endoscope for fluorescence-guided/supported open surgery, the coupler or the opening of the endoscope imager is occupied by the illumination apparatus. Normally, the standard cover cannot be connected to the coupler together with the illumination apparatus and even if that is possible, the standard sterile cover cannot cover both, the endoscope imager and the illumination apparatus. Since both, the endoscope imager and the illumination apparatus are usually not sterilisable, a special (non-standard) cover, which is expensive, has to be bought to use the second system described above.

SUMMARY OF THE INVENTION

The present invention seeks to overcome the disadvantages described above. Amongst others, the present invention seeks to provide a system that can utilize standard equipment which is present in most hospitals.

The problem described above is solved by the illumination apparatus as disclosed herein. Preferred embodiments are described herein and also in the dependent claims.

An illumination apparatus for illuminating the operating field during open surgery with radiation to cause fluorescence according to the present invention comprises
 a main body comprising an opening configured to release the radiation and
 attachment means for attaching the main body sideways to an endoscope imager.

Preferably, the main body is attached in a reversible/non-permanent fashion to the endoscope imager.

Using fluorescence imaging during surgery, for example in tumour resection, is known. Usually, the operating field, i.e. the part of the body to be operated, is illuminated with radiation causing fluorescence in a certain region or cell type. For example, 5-aminolevulinic acid is given to the patient, accumulates in the metabolically active cancer cells and can thus support the surgeon in discriminating between healthy tissue and cancer cells, since only the latter will emit fluorescent radiation.

The fluorescence radiation, i.e. the radiation emitted by a fluorescent molecule such as 5-aminolevulinic acid after absorbing the corresponding excitation radiation, lies within a narrow part of the electromagnetic spectrum so that the presence of absence of fluorescence can easily be detected using appropriate filters. On the one hand, the surgeon looks at the operating field using his eyes to conduct the surgery. On the other hand, the surgeon may look through an eyepiece or at a screen where the fluorescence image, taken by a suitable imaging means, is shown to help the surgeon discriminate between healthy tissue and, for example, cancerous tissue. The imaging means may be a camera specifically designed for that purpose or an endoscope imager which is then used without an endoscope connected thereto.

Within the scope of this invention, the term "endoscope imager" encompasses a camera suitable for taking image or video image of the operating field and for detecting the fluorescence radiation.

One advantage of the present invention is that endoscope imagers which are abundantly available in hospitals may be used for open surgery supported by fluorescence imaging. No separate camera has to be bought.

As will be explained below, the main body of the illumination apparatus can either comprise the radiation source emitting the excitation radiation which causes the fluorescence radiation, or the main body of the illumination apparatus can be connected to the radiation source via light guide cable or the like.

Preferably, the main body of the illumination apparatus is removably connected to the endoscope imager.

The apparatus according to the present invention, which is temporarily and not permanently connected to the endoscope imager, allows it to be used with different kinds of endoscope imagers and is thus very flexible in use.

A further main advantage is that most endoscope imagers comprise a coupler, which allows the endoscope imager to be connected to the endoscope, whose shaft is then introduced into the body of the patient. The coupler may comprise a focusing ring, which allows adjusting the focus of the image taken by the endoscope imager.

In open surgery this coupler is not occupied by a shaft, since the shaft is only needed in endoscopy surgery but not in open surgery. Therefore, a standard sterile cover which can usually be connected to the coupler mentioned above can be connected to this coupler for covering both, the endoscope imager and the illumination apparatus, without the need to provide a separate sterile cover. Since the main body of the illumination apparatus is connected sideways to the endoscope imager, both can easily be covered using the same cover.

This is usually not possible using equipment according to the state of the art.

Since state-of-the-art illumination apparatuses are connected to the coupler mentioned above, they require a separate sterile cover which is often very expensive, since either the standard cover or the illumination apparatus (but not both) can be connected to the coupler. In case, however, both the illumination apparatus and the sterile cover can be connected to the coupler, standard sterile covers cannot cover the illumination apparatus because it is connected in a longitudinal fashion—as opposed to sideways—to the endoscope imager. The present invention overcomes this problem.

As described above, standard sterile covers may accommodate an endoscope, especially its eyepiece. Thus, the endoscope may be coupled to the sterile cover so that the endoscope imager "sees" the image through the eyepiece of the endoscope while the endoscope imager is housed in the sterile cover during surgery. Since this capability of coupling is given in standard equipment, the illumination apparatus according to the present invention can be coupled to the endoscope imager also during endoscopic surgery.

The advantage is, that sometimes endoscopic—i.e. minimally invasive—surgery cannot be performed and the surgeon has to open the body of the patient because endoscopic surgery does not work. In this case, the illumination apparatus according to the present invention is already attached sideways to the endoscope imager and the surgeon can just remove the endoscope and go on with open surgery which may be fluorescence-guided open surgery thanks to the illumination apparatus.

There is also another mode of use how the illumination apparatus according to the present invention may be employed: Sometimes angled endoscopes have to be used because the area to be operated is hardly accessible. The illumination apparatus may be attached sideways to the endoscope imager and the endoscope and the sterile cover may be present at the same time. Thus, the illumination apparatus may illuminate the area to be investigated and/or operated by the angled endoscope.

According to another example, the combination explained before comprising illumination apparatus, sterile cover and endoscope imager may also be used with a standard endoscope which is straight without any angle.

The attachment means of the illumination apparatus according to the present invention may be chosen from the list comprising snap-on means, clip-on-means, strapping-on-means, positive-locking means, screw-means, silicone rubber or other non-permanent adhesive means.

The main body of the illumination apparatus according to the present invention may comprise a radiation source which provides the radiation, i.e. the excitation radiation causing the fluorescence. Integrating the radiation source, for example a LED-light-source, into the main body, leads to the advantage that no separate light source/radiation source is needed and the apparatus can immediately and easily be used during surgery.

Alternatively, the main body may not comprise the light source but rather be connected to the light source which provides the radiation causing the fluorescence. Separating main body and light source leads to the advantage that the illumination apparatus can be constructed in a very simple and straightforward way and that the main body does not heat up during surgery due to the heat generated by the light source providing the excitation radiation. Another advantage over integrated radiation sources is that a separate radiation source/light source usually renders the illumination apparatus more lightweight.

The main body of the illumination apparatus according to the present invention may comprise finger accommodation means. These means are configured to accommodate the fingers of the surgeon handling the illumination apparatus.

The illumination apparatus may at least partially be formed as a handle, so that the surgeon does not hold the endoscope imager but rather the illumination apparatus during surgery.

The finger accommodation means provide at least two advantages.

First, they provide for a more ergonomical positioning of the hand.

Second, in case the illumination apparatus and the endoscope imager are connected in one specific way, i.e. both adopt one specific (and not any random or arbitrary) position relative to each other, the surgeon will automatically hold the endoscope imager in the correct position and angle.

For example, there might only one way in which the illumination apparatus can be connected to the endoscope imager. Alternatively, there are markings or the like indicating how to connect both parts. Both alternatives may be implemented according to the present invention.

When the endoscope imager comprises a chip/photo sensor, which is preferred according to the present invention, it is not clear by intuition how, i.e. especially in which angle, to hold the endoscope imager in order to create the desired image without inadvertently turning the image for example by 90° or 180°.

When the surgeon, however, does not hold the endoscope imager (showing no indication in which angle to hold it), but the illumination apparatus with finger accommodation means, the surgeon will intuitively hold the illumination apparatus—and thus also the endoscope imager connected thereto—in the correct angle.

Without the finger accommodation means of the illumination apparatus, the surgeon might somehow "grab" the endoscope imager and hold it in a way that the picture taken from the endoscope imager and presented on the screen is turned by 90° or 180°.

The present invention comprises, in general, means for making sure that the endoscope imager and the illumination apparatus are connected in only one specific way and orientation.

The illumination apparatus, preferably its main body, may comprise means allowing it to be connected to a stand. Those means may be an alternative to the finger accommodation means described above. Preferably, those means are additionally present in or at the main body of the illumination apparatus so that the surgeon can decide whether to hold it in his hands or connect it to a stand. Such stands are known from commonly used cameras for taking time-exposure-images.

A filter 25 (FIG. 6) may be inserted in the opening of the illumination apparatus, wherein the filter allows only the radiation used to cause fluorescence to pass.

The direction in which the radiation leaves the illumination apparatus may be inclined with respect to the optical axis of the optics of the endoscope imager. The inclination or angle may be chosen so that within a distance of 10 to 30 cm, preferably 15 to 25 cm, a major part of the illumination provided by the illumination apparatus is directed at the optical axis of the endoscope imager. In other words and more generally speaking, the illumination apparatus may comprise means for directing the radiation so that the area "seen" by the endoscope imager is well illuminated. Since the endoscope imager—and thus also the illumination apparatus according to the present invention—is usually placed between 10 to 30 cm from the operating field, the illumination apparatus after being mounted or attached to the endoscope imager may direct a major part of the radiation in a direction so that within a distance of 10 to 30 cm the optical axis lies essentially in the center of the radiated area.

The direction of the radiation/illumination leaving the illumination apparatus preferably refers to an imaginary central axis of the light cone/radiation cone leaving the illumination apparatus.

An additional advantage of the radiation leaving the illumination apparatus with some extent of inclination is that the probability of unwanted reflections may be reduced. The probability of reflections is higher when the illumination/radiation is co-axial with the optical axis of the endoscope imager and lower when the radiation proceeds in a direction that is inclined with respect to the optical axis. Using the inclination according to an embodiment of the present invention, lower false signal is created and the depth of fluorescence detection is increased.

According to an embodiment of the present invention, the illumination apparatus comprises means such as a hinge or the like for varying the inclination, i.e. the angle between the direction of the illumination/radiation leaving the illumination apparatus and the optical axis of the endoscope imager. These means are preferably integrated in the illumination apparatus and change the direction of the illumination leaving the latter. Alternatively, the angle of attachment between the illumination apparatus and the endoscope imager may be changed to vary the inclination.

In varying the inclination the user can adjust the working distance. The Illumination apparatus may be installed and used so that the point of intersection between the optical axis and the imaginary central axis equals the working distance. Thus the illumination/radiation provided by the illumination apparatus is used most efficiently. The means for varying the inclination may be provided so that the point of intersection can be adjusted at a distance to the illumination apparatus and/or to the endoscope imager between 10 and 50 cm.

Generally speaking, the illumination apparatus may comprise means for varying the inclination of the radiation exiting the illumination apparatus when it is attached to an endoscope imager. Varying the inclination preferably results in the possibility of adjusting the working distance between 10 and 50 cm from the illumination apparatus and/or endoscope imager.

The main body of the illumination apparatus may comprise means allowing it to be connected to a stand or a robotic arm or a semi-automatic arm.

The present invention also encompasses a system comprising an illumination apparatus described above and an endoscope imager describer above.

BRIEF DESCRIPTION OF THE DRAWINGS

Advantages, features and details become more evident from the figures, which show in FIGS. 1A and 1B are a schematic views of an endoscope imager 5 and an endoscope 21 according to the state of the art.

DETAILED DESCRIPTION

Figure 2:
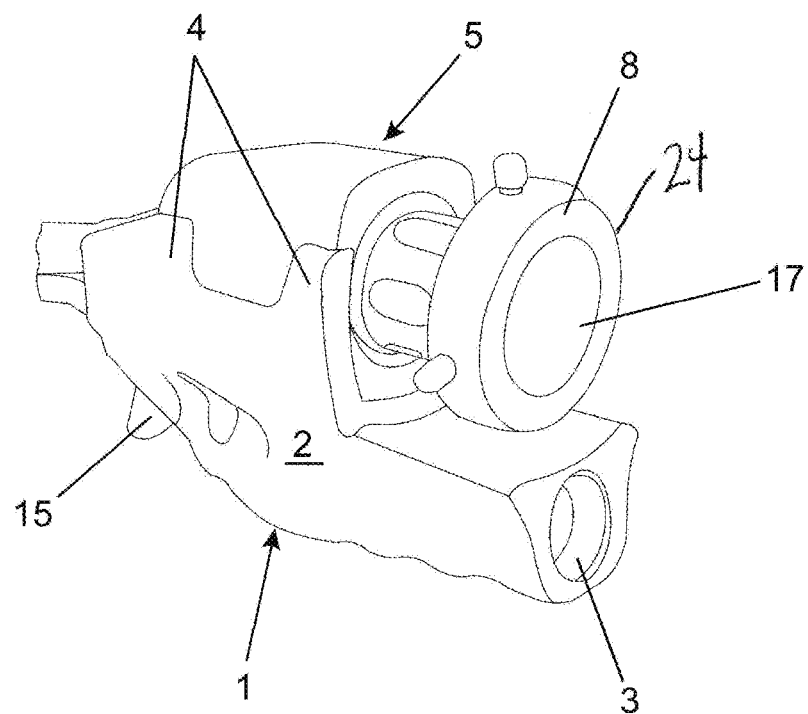
FIGS. 2 to 5 an illumination apparatus 1 according to the present invention attached to an endoscope imager 5.

FIGS. 1A and 1B show an endoscope 21 according to the state of the art with an eyepiece 9, a light guide inlet 22 and a shaft 10. Moreover, an endoscope imager 5 is shown comprising an opening 17 and a coupler 8.

In FIG. 1B, the eyepiece 9 of the endoscope 21 is mounted at the coupler 8.

FIG. 1A differs from FIG. 1B only in that the eyepiece 9—and thus the whole endoscope 21—is detached from the coupler 8.

The arrangement shown in FIG. 1B is utilized in endoscopic surgery. Via a connecting piece 12 an imager cable (not shown) can be connected to the endoscope imager 5 so that the image from within the body is transferred to a screen (not shown).

The standard endoscope 21 best shown in FIG. 1A may also be used in endoscopic surgery without the endoscope imager 5. The surgeon then looks into eyepiece 9 and light is introduced into the body via light guide inlet 22.

The apparatuses and arrangements shown in FIG. 1A/1B are known from the state of the art.

FIGS. 2 to 5 show different perspectives of an embodiment of an illumination apparatus 1 according to the present invention.

The illumination apparatus 1 is attached to a conventional endoscope imager 5 via attachment means 4.

Moreover, FIGS. 2 to 5 show the opening 3 of the illumination apparatus 1, the attachment means 4 in the form of clips 4, finger accommodation means 6, a stand 7, a coupler 8, a connecting piece 12 for the imager cable 11, a light guide cable 13, the hand 14 of a user and a protrusion 15. The coupler 8 may comprise a focusing ring schematically illustrated at 24, FIG. 2, which allows adjusting the focus of the image taken by the endoscope imager.

Referring to FIGS. 2 to 5, the illumination apparatus 1 according to the present invention works as follows:

Via attachment means 4, the main body 2 of the illumination apparatus 1 is connected sideways to a conventional endoscope imager 5. Referring to FIGS. 1a/1b, any known endoscope imager 5 may be used.

Since the illumination apparatus 1 according to the present invention does not occupy the coupler 8, the latter may accommodate a sterile cover as explained below.

Figure 6:
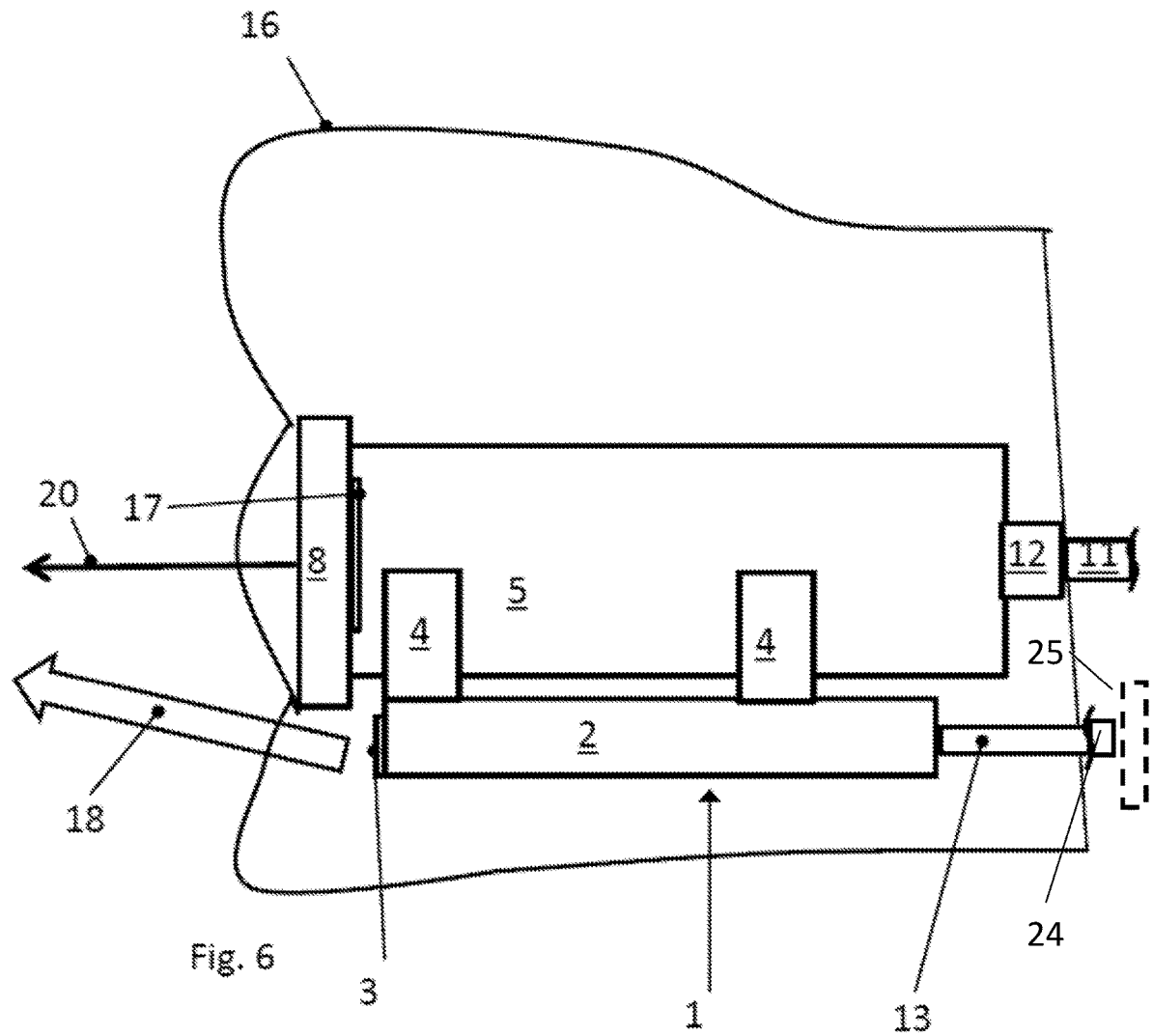
FIG. 6 a schematic view of an illumination apparatus 1 according to the present invention connected to an endoscope imager 5 and a sterile cover 16.
Figure 7:
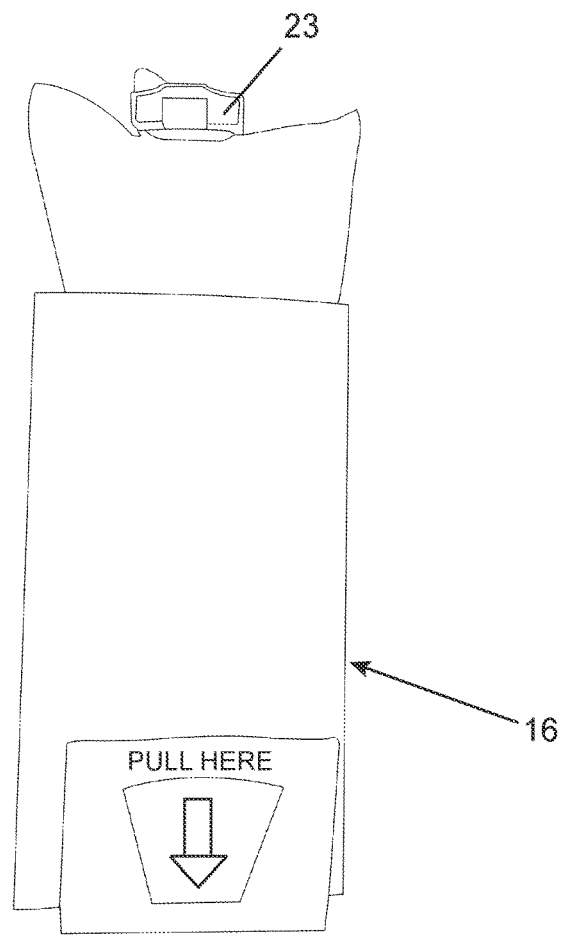
FIG. 7 a standard sterile cover 16.
Figure 8:
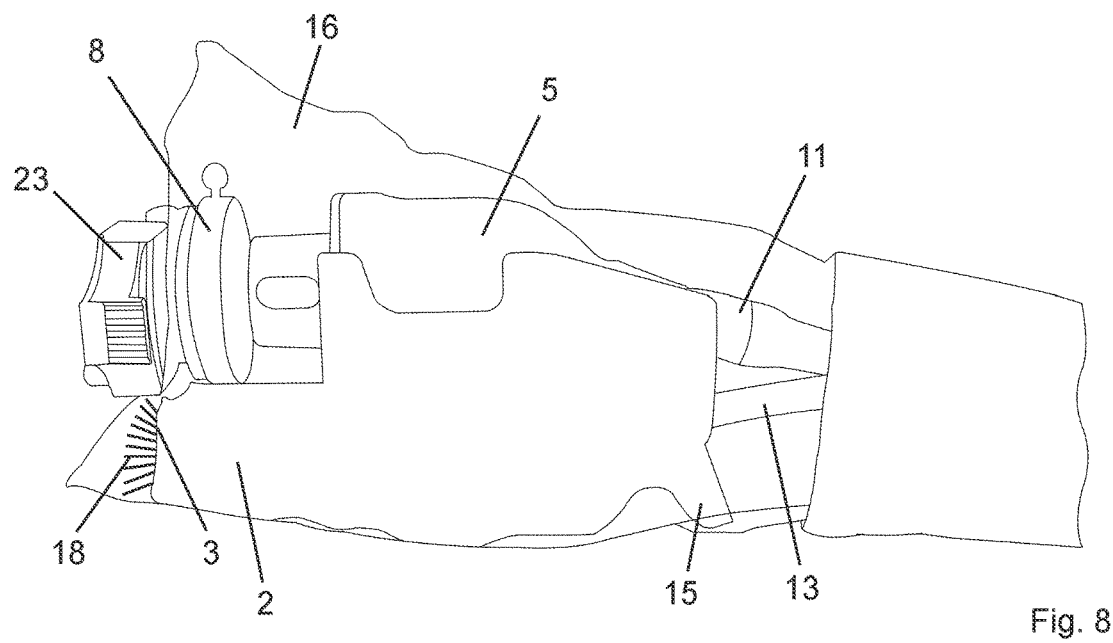
FIG. 8 an illumination apparatus 1 according to the present invention connected to an endoscope imager 5 and a sterile cover 16.

As shown only in FIGS. 6 and 8, a standard sterile cover 16 may be connected to the coupler 8 and cover both, the endoscope imager 5 and the illumination apparatus 1. The radiation 18 emitted by the illumination apparatus 1 permeates the sterile cover 16, which is usually transparent. Thus, the operating field (not shown) is illuminated by the illumination apparatus 1 although the latter is covered by the sterile cover 16.

Standard sterile covers 16 are designed so that they are easily connected to the coupler 8 and cover the whole endoscope imager 5.

Since the optics of the endoscope imager "sees" the operating field through opening 17, the part of the cover 16 covering the opening 17 is designed so that the vision is not impaired. A combined imaging window and connecting piece 23 as shown in FIG. 8 may be employed. Piece 23 combines a connecting piece which may accommodate an endoscope, for example, and a transparent imaging window which makes sure that the vision of opening 17 is not blocked or impaired. Such a cover 16 is known from the state of the art.

The image taken by the endoscope imager 5 in FIGS. 2 to 6 is transported via the imager cable 11 connected to the connecting piece 12 to a processor or the like and eventually to a screen (not shown).

The radiation or illumination 18 sent by the illumination apparatus 1 to the operating field (not shown) is provided by a light source 24 (FIG. 6), which is connected to the illumination apparatus 1 via the light guide cable 13 connected to the illumination apparatus 1.

Figure 3:
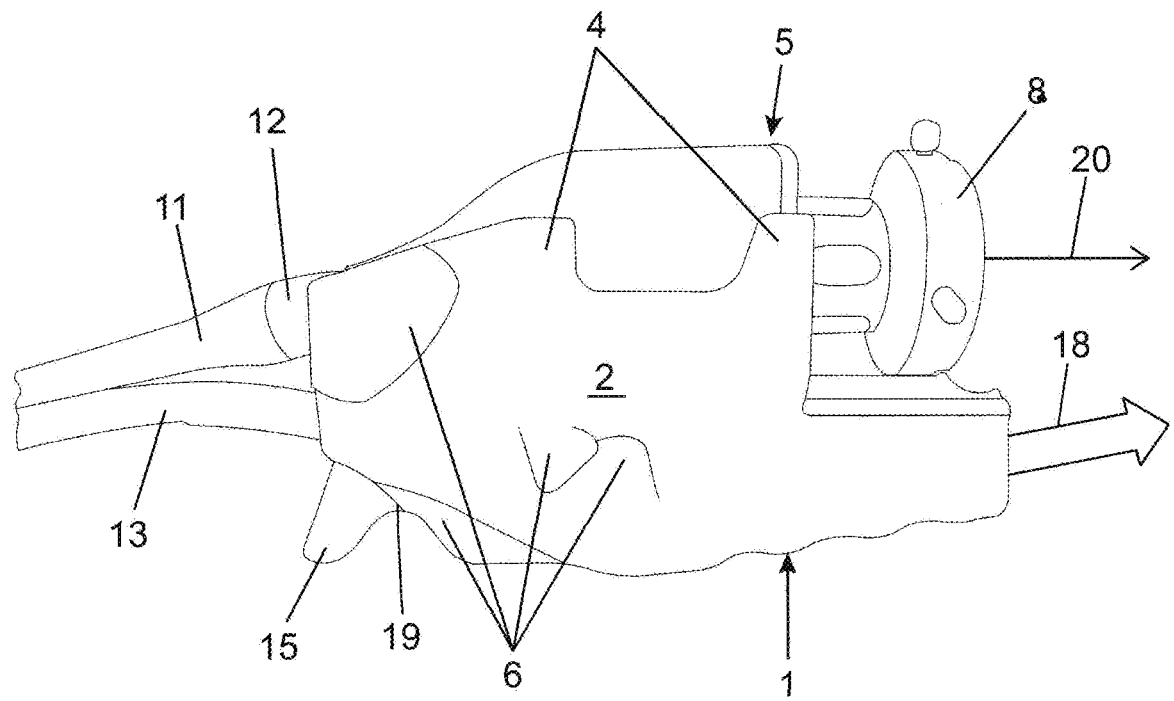
Figure 4:
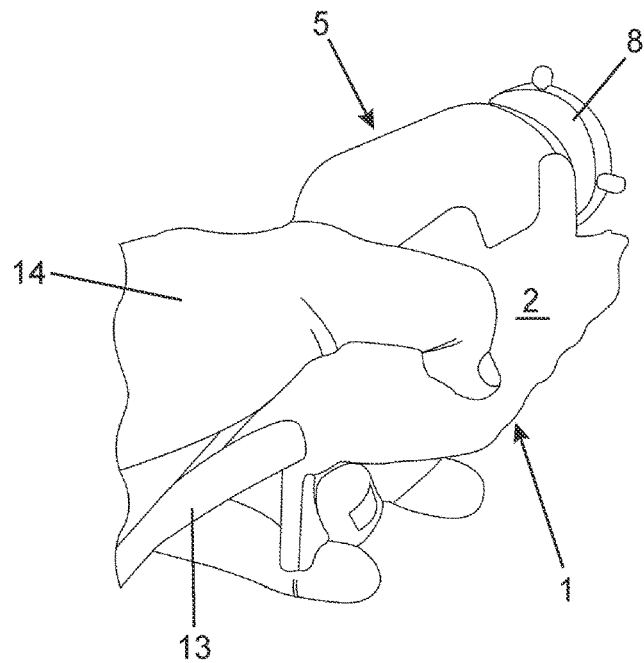

Comparing FIGS. 3 and 4 it is evident how the finger accommodation means 6 allow the user to get hold of the illumination apparatus 1 instinctively.

Figure 5:
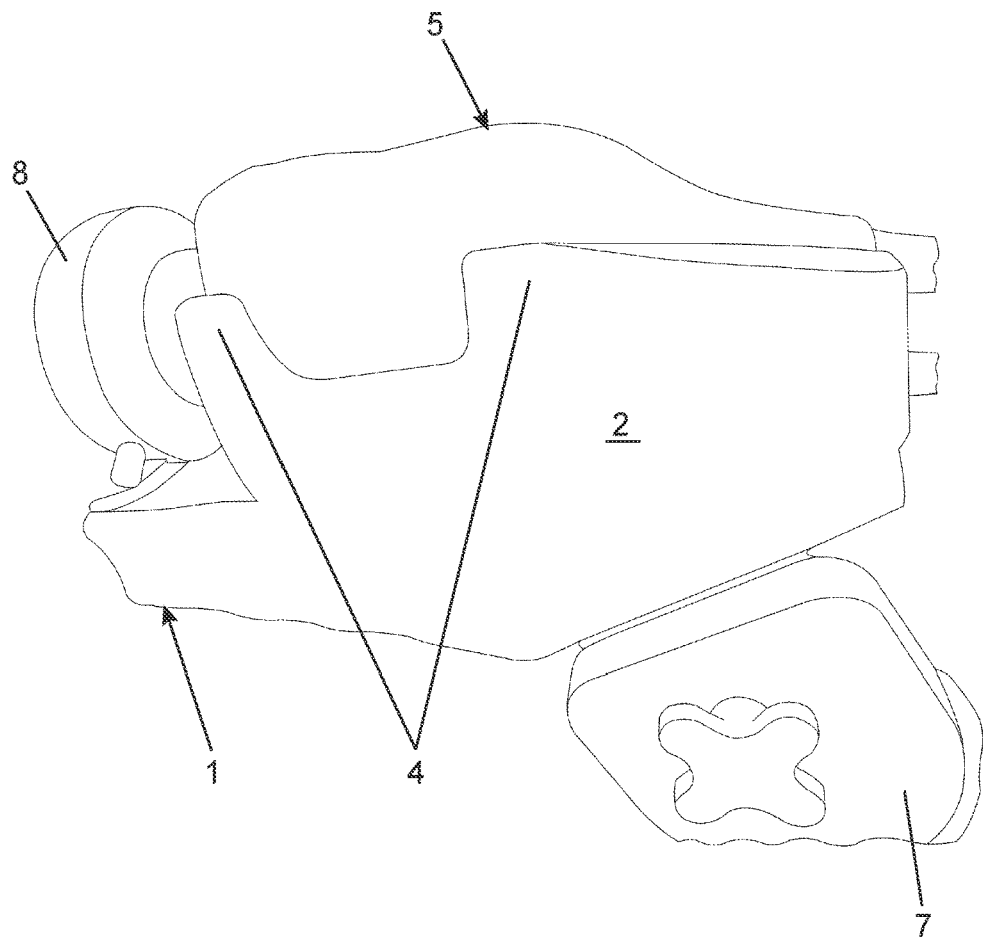

FIG. 5 shows how the illumination apparatus 1 can be connected to a stand 7 in case the user does not want to hold it in the hand 14. The stand 7 is easily connected to the protrusion 15 with the recess 19 shown in FIGS. 2, 3 and 4.

Together with the recess 19 next to it, the protrusion 15 may form both, a connection piece to connect the illumination apparatus 1 to the stand 7 and one of the finger accommodation means 6. The design of the protrusion 15 shown in FIGS. 2 and 3 is especially suitable accommodating the finger and being connected to a stand 7, since it has a high surface area.

As can be seen in FIGS. 3 and 6, the direction of the radiation 18 leaving the illumination apparatus may be inclined in a way so that within a distance of 10 to 30 cm, the area around the optical axis 20 of the endoscope imager 5 is illuminated well.

As shown in FIG. 8, the radiation 18 leaving the opening 3 of the main body 2 of the illumination apparatus 1 travels through the transparent sterile cover 16. Because the main body 2 is attached sideways to the endoscope imager 5, there are no parts blocking the radiation 18 from exiting the sterile cover 16.

| Reference Numbers | | |
|---|---|---|
| 1 | illumination apparatus | 34 |
| 2 | main body of the illumination apparatus | 35 |
| 3 | opening of the illumination apparatus | 36 |
| 4 | attachment means | 37 |
| 5 | endoscope imager | 38 |
| 6 | finger accommodation means | 39 |
| 7 | stand | 40 |
| 8 | coupler | 41 |
| 9 | eyepiece | 42 |
| 10 | shaft | 43 |
| 11 | imager cable | 44 |
| 12 | connecting piece for imager cable | 45 |
| 13 | light guide cable | 46 |
| 14 | hand | 47 |
| 15 | protrusion | 48 |
| 16 | sterile cover | 49 |
| 17 | opening of the endoscope imager | 50 |
| 18 | radiation | 51 |
| 19 | recess | 52 |
| 20 | optical axis | 53 |
| 21 | endoscope | 54 |
| 22 | light guide inlet | 55 |
| 23 | imaging window and connecting piece | 56 |
| 24 | | 57 |
| 25 | | 58 |

| Reference Numbers | |
|---|---|
| 26 | 59 |
| 27 | 60 |
| 28 | 61 |
| 29 | 62 |
| 30 | 63 |
| 31 | 64 |
| 32 | 65 |
| 33 | 66 |

The invention claimed is:

1. A system, comprising:
an endoscope imager (5) having a distal end and a direct imaging axis to an operating field during open surgery; and
an illumination apparatus (1) for illuminating the operating field during open surgery with radiation to cause fluorescence,
the illumination apparatus (1) comprising
a main body (2) having an extension defining an opening (3) configured to release the radiation (18), wherein the illumination apparatus (1) further comprises
attachment means (4) for attaching the main body (2) sideways to the endoscope imager (5) such that the extension of the main body extends beyond the distal end of the endoscope imager (5) and the radiation is released from the opening (3) along an optical axis that is laterally spaced from and inclined relative to the direct imaging axis of the endoscope imager (5), wherein the endoscopic imager (5) comprises a coupler (8) which allows the endoscopic imager (5) to be connected to an endoscope (21), and further wherein the coupler (8) comprises a focusing ring (24) which allows adjusting of focus of images taken by the endoscopic imager (5).

2. The system according to claim 1, wherein the attachment means (4) are selected from the group consisting of snap-on means, clip-on-means, strapping-on-means, positive-locking means, screw-means, silicone rubber and other non-permanent adhesive means.

3. The system according to claim 1, wherein the main body (2) comprises a radiation source which provides the radiation.

4. The system according to claim 1, wherein the main body (2) is connected to a radiation source which provides the radiation.

5. The system according to claim 1, wherein the main body (2) integrally defines a holding element (15) extending downwardly from the main body (2) for engaging with a finger of a user of the system.

6. The system according to claim 1, wherein the main body comprises means (15) allowing it to be connected to a stand or a robotic arm or a semi-automatic arm.

7. The system according to claim 1, wherein a filter is inserted in the opening (3) which allows only the radiation used to cause fluorescence to pass.

8. The system according to claim 1, further comprising means for varying the inclination of the radiation exiting the illumination apparatus (1) when it is attached to the endoscope imager (5).

9. The system according to claim 1, wherein the main body comprises a unitary structure defining the attachment means, the extension and the opening.

10. A method for illuminating the operating field during open surgery with radiation to cause fluorescence using the system of claim 1, the method comprising the steps of:
- connecting the main body (2) of the illumination apparatus (1) sideways to the endoscope imager (5) with the attachment means (4) for attaching the main body (2) to the endoscopic imager (5) such that radiation is released from the opening (3) along the optical axis that is laterally spaced from the imaging axis of the endoscopic imager (5);
- applying a sterile cover to the imaging apparatus by way of the coupler (8) to cover both the endoscope imager (5) and the illumination apparatus (1), wherein the coupler (8) comprises a focusing ring (24) which allows adjusting of focus of images taken by the endoscopic imager (5); and
- emitting radiation (18) from the illumination apparatus (1) to permeate the sterile cover (16) and illuminate the operating field.

11. A system comprising an endoscope imager (5) and an illumination apparatus (1) for illuminating the operating field during open surgery with radiation to cause fluorescence, the illuminating apparatus (1) comprising:
- a main body (2) comprising an opening (3) configured to release the radiation (18), and
- attachment means (4) for attaching the main body (2) sideways to the endoscope imager (5) such that the radiation is released from the opening (3) along an optical axis that is laterally spaced from an imaging axis of the endoscope imager (5); and further comprising
- a coupler (8) arranged at an opening of the endoscope imager (5);
- a cover (16) configured to cover the illuminating apparatus (1) and the endoscopic imager (5); and
- a connection piece (23) for securing the cover (16) relative to the endoscope imager (5) and the illuminating apparatus (1) such that the radiation (18) released from the opening (3) passes through the cover (16), wherein the coupler (8) is configured to accommodate the cover (16) for covering the system and further wherein the coupler (8) comprises a focusing ring (24) which allows adjusting of focus of images taken by the endoscopic imager (5).

* * * * *